United States Patent [19]
Yada

[11] 3,807,243

[45] Apr. 30, 1974

[54] MECHANICAL POWER TRANSMISSION APPARATUS USING BALLS

[75] Inventor: Tsuneji Yada, Tokyo, Japan

[73] Assignee: Agency of Industrial Science & Technology, Tokyo, Japan

[22] Filed: Nov. 17, 1972

[21] Appl. No.: 307,355

[30] Foreign Application Priority Data
  Nov. 17, 1971  Japan.............................. 46-92180
  Apr. 10, 1972  Japan.............................. 47-35936

[52] U.S. Cl........................ 74/63, 74/459, 64/23.7
[51] Int. Cl............................................. F16h 21/12
[58] Field of Search.................. 74/63, 459, 424.8

[56] References Cited
UNITED STATES PATENTS

| 2,214,493 | 9/1940 | Trbojevich | 74/459 |
| 2,890,594 | 6/1959 | Galonska | 74/459 |
| 2,905,012 | 9/1959 | Lohr et al. | 74/424.8 |
| 3,618,422 | 11/1971 | Korner | 74/459 |

Primary Examiner—Benjamin W. Wyche
Assistant Examiner—Wesley S. Ratliff, Jr.
Attorney, Agent, or Firm—Kurt Kelman

[57] ABSTRACT

Disclosed is a new mechanical power transmission apparatus using a plurality of balls which are held by a grooved ball-retainer between a threaded transmission shaft and a grooved cylinder. The transmission apparatus can be connected between a driving member and a driven member in the form of a mechanical couples, thus permitting these members to align with each other.

8 Claims, 8 Drawing Figures

3,807,243

MECHANICAL POWER TRANSMISSION APPARATUS USING BALLS

BACKGROUND OF THE INVENTION

This invention generally relates to a mechanical power transmission apparatus, and more particularly to an apparatus for transmitting power from an output shaft of a driving member to an input shaft of a driven member at a reduced speed.

Heretofore, gears, belt wheels, sprocket wheels and the like have been used as a speed reducing device. In these devices the output shaft of a driving member cannot be aligned with the input shaft of the driven member. Also, in the conventional mechanical power transmission device, the speed reducing element is separate from the shaft bearing element, and this independent structure in fact limits the reduction of overall size.

SUMMARY OF THE INVENTION

One object of this invention is to provide a new and simple mechanical power transmission apparatus using a plurality of balls which are held by a grooved ball-retainer between a threaded transmission shaft and a grooved cylinder.

Another object of this invention is to provide a mechanical power transmission apparatus which can be connected both to the output shaft of a driving member and to the input shaft of a driven member in aligned relationship.

Still another object of this invention is to provide a mechanical power transmission apparatus of the above mentioned type in which apparatus a plurality of balls which are being used are continuously checked, and any defective balls will be changed for new ones, thus assuring smooth and reliable operation of the whole system.

To attain the above objects, the mechanical power transmission apparatus according to this invention essentially comprises a threaded transmission shaft; a grooved cylinder embracing the transmission shaft; a grooved ball-retainer provided between the transmission shaft and the grooved cylinder; a plurality of balls which are rotatably fitted in the grooves of the retainer and partly contained in the grooves of the cylinder and the spiral grooves of the transmission shaft; and means to feed the balls back from the outlet to the inlet of the channel composed of the grooves of the ball-retainer and those of the cylinder.

The mechanical power transmission apparatus according to this invention further comprises means for continuously checking the balls participating in mechanical power transmission and means for detecting and renewing defective balls.

BRIEF DESCRIPTION OF THE DRAWINGS

These and other objects and advantages of this invention will be more apparent from the following description when considered in connection with the accompanying drawings is which.

DESCRIPTION OF THE PREFERRED EMBODIMENTS

Figure 1:
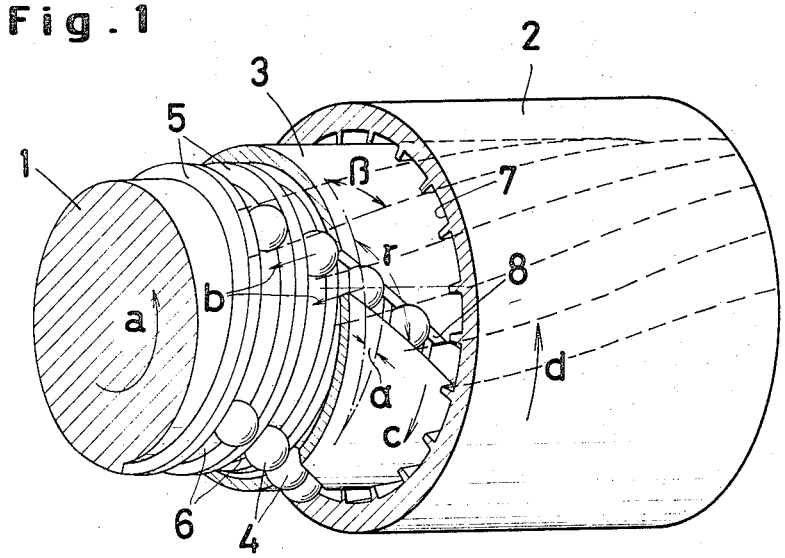
FIG. 1 is a perspective view of a mechanical power transmission apparatus according to this invention, partly broken to show the inner structure of the apparatus.

Referring to the drawings, particularly to FIG. 1, the mechanical power transmission apparatus is composed of a threaded transmission shaft 1, a grooved cylinder 2 embracing the transmission shaft 1, a ball-retainer 3 and a plurality of balls 4 intervening between the transmission shaft 1 and the cylinder 2. Spiral ridges 5 are formed on the surface of the transmission shaft 1, thus providing the spiral grooves 6 in which a plurality of balls 4 are rotatably fitted. A plurality of cooperating parallel grooves 7 are formed on the inner surface of the cylinder 2 axially or obliquely. Also, a plurality of grooves 8 which are oblique to the grooves 7 of the cylinder 2 are formed on the ball-retainer 3. Numerous balls 4 are fitted in these grooves 6, 7 and 8 between the transmission shaft 1 and the cylinder 2.

Figure 2:
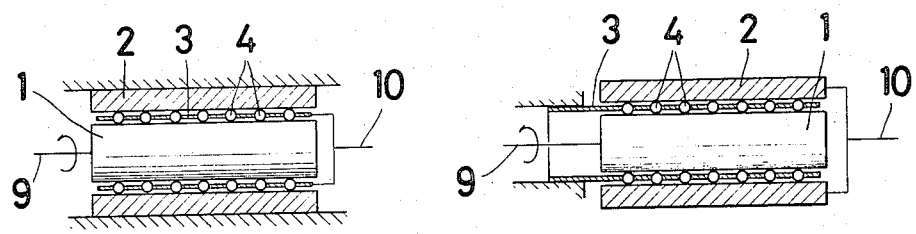
FIG. 2(A) is a longitudinal sectional view of a mechanical power transmission system whose transmission shaft and ball-retainer are connected to the output shaft of a driving member and the input shaft of a driven member respectively.
FIG. 2(B) is a similar view of a mechanical power transmission system whose transmission shaft and cylinder are connected to the output shaft of a driving member and to the input shaft of a driven member respectively.
FIG. 2(C) is a longitudinal sectional view of multicylinder type mechanical power transmission apparatus whose transmission shaft and outermost cylinders are connected to the output shaft of a driving member and the input shaft of a driven member respectively.
Figure 2:
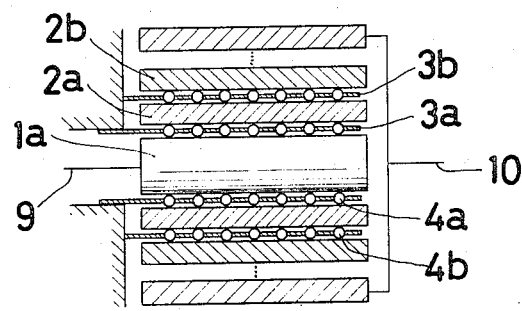

In operation, assume that the cylinder 2 is fixed as shown in FIG. 2(A), and that the transmission shaft 1 which is connected to the output shaft 9 of a driving member (not shown) is rotated in the direction indicated by arrow $a$ (FIG. 1). The movement of the balls is restricted by the grooves 7 of the cylinder 2. Therefore, the rotation of the transmission shaft 1 and hence of the spiral grooves 6 of the shaft 1 thereof will cause the balls 4 to travel along the grooves 7 of the cylinder 2 in the direction indicated by arrow $b$. Thus, the travelling balls 4 apply force to push the ball-retainer 3 in the direction indicated by arrow $c$ with the result that the ball-retainer 3 rotates in the direction indicated by arrow $c$ opposite to the rotation of the transmission shaft 1. The ball-retainer 3 when connected to the input shaft 10 of a driven member (not shown) will transmit the rotary force from the transmission shaft 1 to the input shaft 10 of a driving member at a reduced speed.

In instances where another rotary input is applied to the grooved cylinder 2, the sum or difference of the rotary inputs applied to the transmission shaft 1 and cylinder 2 will be produced at the input shaft 10 of the driven member, which is connected to the ball-retainer 3.

Assume that the ball-retainer 3 is fixed as shown in FIG. 2(B). As mentioned earlier, the movement of the balls is restricted by the grooves 8 of the ball-retainer 3. With this in mind, assume that the transmission shaft 1 is rotated in the direction as indicated by arrow a. The rotation of the transmission shaft 1 will allow the spiral grooves 6 thereof to push back the balls 4, thus causing the balls 4 to travel along the grooves 8 of the stationary ball-retainer 3. In the course of travelling, the balls 4 apply a force to the grooves 7 of the cylinder; pushing and rotating the same in the direction indicated by arrow d. When connected to an input shaft 10 of a driven member, the cylinder 2 will transmit rotation from its input to its output at a reduced velocity in the same direction as the output shaft of the driving member.

Contrary to the above, if the cylinder 2 is connected to the output shaft of a driving member, the transmission shaft will provide a rotary output at an increased speed. In this case, however, it is necessary to use a transmission shaft having spiral grooves 6 of a relatively large lead angle and a cylinder 2 having inner grooves 7 inclining so as to be in close proximity to the plane normal to the longitudinal axis.

Figures 5, 6:
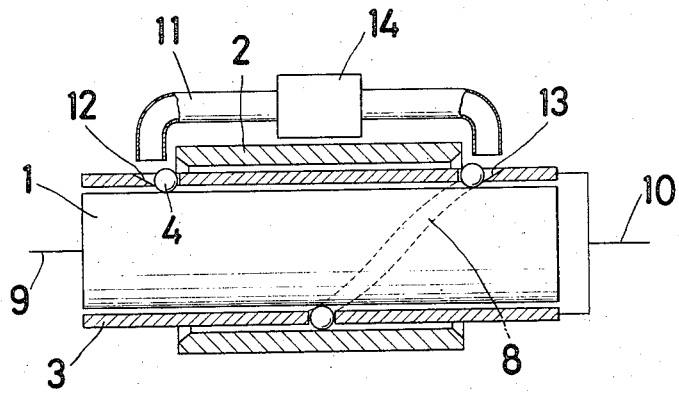
FIG. 5 is a longitudinal sectional view of a mechanical power transmission apparatus having ball feeding-back means according to this invention.
FIG. 6 is a explanatory view showing a ball checking and renewing device according to the present invention.

After passing through the spiral grooves 6 of the transmission shaft and the inner grooves 7 of the cylinder 2, the balls will be fed back to the inlet end of the channel by a proper means such as shown in FIG. 5.

In FIG. 2(C), a multi-cylinder type mechanical power transmission apparatus is shown. This embodiment comprises a first transmission step which includes a transmission shaft 1a, a cylinder 2a, a ball-retainer 3a, and a plurality of intervening balls 4a; a second transmission step which includes the cylinder 2a of the first transmission step, a cylinder 2b, a ball-retainer 3b, and a plurality of intervening balls 4b; and so on, the cylinder of each transmission step except for the outermost cylinder having on the outer surface thereof, the same spiral grooves as those of the transmission shaft. If each ball-retainer is fixed as shown in FIG. 2(C), the input to the transmission shaft 1a will be transmitted to the outermost cylinder at a greatly reduced speed.

Figure 3:
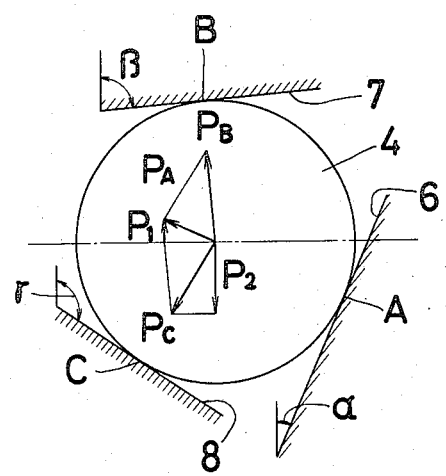
FIG. 3 is a explanatory view showing how the force acts between a ball and the abutting points of the associated members.

Taking an example of the mode of operation in which the cylinder 2 is fixed, and the transmission shaft 1 is set free to rotate (See FIG. 2(A)), the force and velocity transmitted via intervening balls will be explained with reference to FIGS. 3 and 4. Assume that the spiral groove 6 of the transmission shaft 1 is inclined at the angle $\alpha$ to the direction normal or perpendicular to the longitudinal axis X; the inner groove 7 of the cylinder 2 is inclined at the angle $\beta$ to the normal direction; and the groove 8 of the ball-retainer 3 is inclined at the angle $\gamma$ to the normal direction. The ball 4 is fitted in those grooves abutting against the surfaces of the grooves at the points A, B and C. The normal component $P_A$ of the force applied to the ball 4 upon the rotation of the transmission shaft 1 can be divided into the normal component $P_B$ acting on point B of the cylinder 2 and the normal component $P_C$ acting on point C of the ball-retainer 3. The cylinder 2 is stationary, and therefore the normal component $P_B$ acting on point B will balance the counter force. Thus, only the normal component $P_C$ acting on point C of the ball-retainer 3 will be transmitted to the output. More specifically, the component $P_2$ of the force $P_C$ in the direction perpendicular to the axis X will appear at the output. $P_1$ indicates the component of the force $P_A$ in the direction perpendicular to the axis X.

Figure 4:
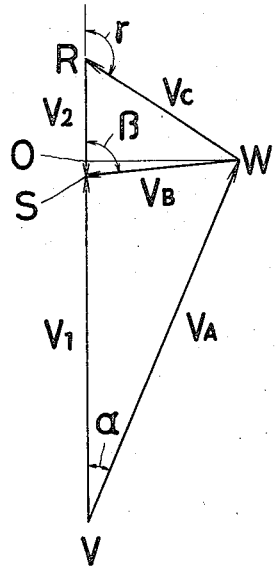
FIG. 4 is a explanatory view showing a velocity in power transmission.

As for the velocities of the associated elements of the transmission, assume that the transmission shaft 1 moves at the velocity of $V_1$ and that the ball slides along the spiral groove 6 of the transmission shaft at the slip velocity of $V_A$, and at the same time the ball moves along the groove 7 of the cylinder at the velocity of $V_B$ (See FIG. 4). This velocity $V_B$ will be transmitted to the ball-retainer 3.

The velocity $V_B$ can be devided into the slip velocity $V_C$ along the groove 8 of the ball-retainer and a component $V_2$ in the direction normal or perpendicular to the axis X. The ball-retainer rotates at the normal-to-axis component $V_2$.

The transmission ratio j of the mechanical power transmission apparatus is determined by:

$$j = v_2/v_1 = \overline{RS}/\overline{SV}$$

As is apparent from FIG. 4, $\overline{RS}$ and $\overline{SV}$ are given by;

$$\overline{RS} = -\overline{OR} + \overline{OS} = \overline{OW}(-\cot \gamma + \cot \beta)$$
$$\overline{SV} = \overline{OV} - \overline{OS} = \overline{OW}(\cot \alpha - \cot \beta)$$

Therefore, the transmission ratio is given by:

$$j = (\cot \beta - \cot \gamma)/(\cot \alpha - \cot \beta)$$

As is obvious from this equation, the transmission ratio of the apparatus depends upon the factors $\alpha$, $\beta$ and $\gamma$.

As shown in FIG. 5, the transmission apparatus has a means to allow the balls to return from the outlet end to the inlet end of the groove channel, thus assuring that the balls circulate through the entire apparatus. More specifically, a ball path 11 communicating the exit and entrance ends of the groove channel is provided to the mechanical power transmission. The exit end of the groove of the ball-retainer has a guide surface 13 to direct the balls to the ball path 11 whereas the inlet end of the groove of the ball-retainer has a guide surface 12 to direct the balls to the groove of the ball-retainer. A detector 15 is provided in the ball path 11 to detect and reject defective balls, if any. Also, a ball exchanger 14 is provided to remove a defective ball $4'a$ from the ball path 11, and at the same time to supply a new ball $4'b$ to the ball path. The exchanger is responsive to a signal or instruction from the detector 15 to change a defective ball for a new one. The exchanger functions to push a defective ball $4'a$ with a new one $4'b$ when the defective ball reaches the exchanger, as shown in FIG. 6 and described later in more detail.

A detector 15 may comprise an air-micrometer. In this device air pressure is applied to the ball, and the diameter of the ball and hence the wear or deformation thereof can be determined in terms of the air pressure generated behind the ball.

The air-micrometer can also count the number of the balls passing therethrough in terms of the number of pulsations of air pressure. The distance between the detector 15 and the exchange station is set an integral times as large as the diameter of a ball. Thus, the detector sends a signal to the exchanger after the detector counts a number of balls equal to the number of balls occupying the length from the detector to the exchange station.

The ball exchanger is responsive to the signal from the detector to open gates 16a and 16b, and at the same time to allow a rod to give a stroke as long as the ball diameter to an accumulation of balls 4'b in the transverse direction to the ball passage, thus pushing the defective ball 4'a out of the path and inserting a new ball 4'b in place of the defective one thus removed.

As seen from the above, the balls continuously circulate in the entire apparatus, and while circulating the balls are continuously checked so that a defective ball if any, may be changed for a new one, thus assuring the smooth and reliable operation of the whole system.

What is claimed is:

1. A mechanical power transmission apparatus comprising in combination, a transmission shaft having a spiral groove thereon, a ball-retainer having at least one groove, said ball-retainer enclosing said transmission shaft in coaxial relation, a cylinder having a plurality of parallel grooves on the inner surface thereof, said cylinder encircling said ball-retainer in coaxial relation, said shaft, ball-retainer and cylinder moving independently of each other and said grooves being inclined in the opposite directions to one another and having different lead angles from one another, and a plurality of balls which are rotatably fitted in the space defined by said spiral groove of said transmission shaft, said groove of said ball-retainer and said parallel grooves of said cylinder.

2. A mechanical power transmission apparatus according to claim 1 wherein said apparatus further comprises external means for feeding back said balls from one end to the other end of said groove of said ball-retainer, thus forming a closed loop path to allow said balls to circulate through the entire apparatus.

3. A mechanical power transmission apparatus according to claim 2 wherein said apparatus further comprises external means to detect a defective ball among the balls circulating in the entire apparatus and means responsive to detection of a defective ball to change the defective ball for a new one.

4. A mechanical power transmission apparatus according to claim 1 wherein said parallel grooves of said cylinder is in parallel with the longitudinal axis of said apparatus.

5. A mechanical power transmission apparatus according to claim 1 wherein said parallel grooves of said cylinder is inclined with respect to the longitudinal axis of said apparatus.

6. A mechanical power transmission apparatus according to claim 1 wherein said groove of said ball-rretainer is in parallel with the longitudinal axis of said apparatus.

7. A mechanical power transmission apparatus according to claim 1 wherein said groove of said ball-retainer is spiral.

8. A mechanical power transmission apparatus comprising a transmission shaft having a spiral groove thereon, a plurality of ball-retainers each having at least one groove, a set of cylinders of a number which is smaller by one than the number of said ball-retainers, each of said set of cyliners having a plurality of parallel grooves on the innersurface thereof and a spiral groove on the outersurface thereof, one cylinder having a plurality of parallel grooves on the innersurface only thereof, said ball-retainers and said set of cylinders being alternately and telescopically fitted over said transmission shaft and said one cylinder being fitted in the outermost position of the coaxial assembly thus formed, and a plurality of balls rotatably fitted in the spiral grooves of said ball-retainers.

* * * * *